US007929826B2

(12) United States Patent
Haino et al.

(10) Patent No.: US 7,929,826 B2
(45) Date of Patent: Apr. 19, 2011

(54) INFORMATION RECORDING APPARATUS, INFORMATION RECORDING METHOD AND INFORMATION RECORDING MEDIUM IN WHICH RECORDING CONTROLLING PROGRAM IS RECORDED

(75) Inventors: Nobuo Haino, Tokorozawa (JP); Kazutaka Mitsuki, Tokorozawa (JP); Hidehiro Ishii, Tokorozawa (JP); Katsumi Kawamura, Tokorozawa (JP)

(73) Assignee: Pioneer Corporation, Tokyo (JP)

(*) Notice: Subject to any disclaimer, the term of this patent is extended or adjusted under 35 U.S.C. 154(b) by 1281 days.

(21) Appl. No.: 11/504,660

(22) Filed: Aug. 16, 2006

(65) Prior Publication Data
US 2006/0280464 A1 Dec. 14, 2006

Related U.S. Application Data

(63) Continuation of application No. 09/929,110, filed on Aug. 15, 2001, now abandoned.

(30) Foreign Application Priority Data

Aug. 16, 2000 (JP) ................ P2000-247033

(51) Int. Cl.
*H04N 5/93* (2006.01)
*G11B 27/00* (2006.01)
(52) U.S. Cl. ...................... 386/278; 386/279
(58) Field of Classification Search .......... 386/1, 45–46, 386/125–126
See application file for complete search history.

(56) References Cited

U.S. PATENT DOCUMENTS

| 5,946,277 | A | 8/1999 | Kuroda et al. |
| 6,148,140 | A | 11/2000 | Okada et al. |
| 6,341,196 | B1 * | 1/2002 | Ando et al. ................ 386/95 |
| 6,501,727 | B1 | 12/2002 | Nozaki et al. |
| 6,553,180 | B1 | 4/2003 | Kikuchi et al. |

FOREIGN PATENT DOCUMENTS

| EP | 0 784 313 | 7/1997 |
| EP | 0 967 611 | 12/1999 |
| EP | 1 067 552 | 1/2001 |
| JP | 09-288884 | 11/1997 |
| JP | 11-232792 | 8/1999 |
| JP | 2000-222863 | 8/2000 |

OTHER PUBLICATIONS

E-mail exchange of Sep. 23, 2005 and Sep. 27, 2005 between M. Piet Mourik, examiner at EPO, and Ms. Miho Yonemura, deputy manager at the "DVD Format/Logo Licensing Corporation", in charge of selling the DVD specifications, see http://www.dvdfllc.co.jp.
"Obtaining a Format Book", Jun. 2000 from http://www.dvdfllc.co.jp.
"About DVD FLLC, Our Company", http://www.dvdfllc.co.jp.

* cited by examiner

*Primary Examiner* — Thai Tran
*Assistant Examiner* — Nigar Chowdhury
(74) *Attorney, Agent, or Firm* — Drinker Biddle & Reath LLP

(57) ABSTRACT

In the case of recording information in a DVD-R 1R as complying with a DVD video standard, which is configured with including at least of a VTS including a VOBS to be reproduced and VTSI and VMGI for controlling the reproduction of one or plural VTSs, the VTS is recorded in the DVD-R 1R. After the VTS is recorded, the tentative VMGI as the tentative control information corresponding to the recorded VTS to form the VMGI after that and to record this VMGI in the DVD-R 1R. Then, the generated tentative VMGI is recorded in the DVD-R 1R every when the VTS is recorded in the DVD-R 1R.

9 Claims, 11 Drawing Sheets

FIG. 11

| | FIRST MANAGING DATA AT THE TIME OF THIRD RECORDING ZONE RECORDING START | SECOND MANAGING DATA AFTER THIRD RECORDING ZONE SECURING PROCESSING | THIRD MANAGING DATA AFTER SECOND RECORDING ZONE SECURING PROCESSING | FOURTH MANAGING DATA AT THE TIME OF FIFTH RECORDING ZONE RECORDING START |
|---|---|---|---|---|
| UNDECIDED RECORDING ZONE NUMBER | 3 | 4 | 4 | 5 |
| FIRST RECORDING ZONE NUMBER | 1 | 1 | 1 | 1 |
| SECOND RECORDING ZONE NUMBER | 2 | 2 | 0 | 0 |
| BACKUP AREA | | | | |
| FIRST RECORDING ZONE START POSITION INFORMATION | 0 | 0 | 0 | 0 |
| FIRST RECORDING ZONE FINAL RECORDING POSITION INFORMATION | 0 | 0 | 0 | 0 |
| SECOND RECORDING ZONE START POSITION INFORMATION | 600 | 600 | 600 | 600 |
| SECOND RECORDING ZONE FINAL RECORDING POSITION INFORMATION | 0 | 0 | 639 | 639 |
| THIRD RECORDING ZONE START POSITION INFORMATION | 640 | 640 | 640 | 640 |
| THIRD RECORDING ZONE FINAL RECORDING POSITION INFORMATION | 0 | 669+s1 | 669+s1 | 669+s1 |
| FOURTH RECORDING ZONE START POSITION INFORMATION | 0 | 670+s1 | 670+s1 | 670+s1 |
| FOURTH RECORDING ZONE FINAL RECORDING POSITION INFORMATION | 0 | 0 | 0 | 679+s1 |
| FIFTH RECORDING ZONE START POSITION INFORMATION | 0 | 0 | 0 | 680+s1 |
| FIFTH RECORDING ZONE FINAL RECORDING POSITION INFORMATION | 0 | 0 | 0 | 0 |
| ... | ... | ... | ... | ... |
| 254TH RECORDING ZONE START POSITION INFORMATION | 0 | 0 | 0 | 0 |
| 254TH RECORDING ZONE FINAL RECORDING POSITION INFORMATION | 0 | 0 | 0 | 0 |
| | M1 | M2 | M3 | M4 |

INFORMATION RECORDING APPARATUS, INFORMATION RECORDING METHOD AND INFORMATION RECORDING MEDIUM IN WHICH RECORDING CONTROLLING PROGRAM IS RECORDED

This is a continuation application of application Ser. No. 09/929,110, filed on Aug. 15, 2001, now abandoned, which is incorporated by reference herein in its entirety.

BACKGROUND OF THE INVENTION

1. Field of the Invention

The present invention relates to a technical field of an information recording apparatus, an information recording method and an information recording medium in which a recording controlling program is recorded. More specifically, the present invention relates to a technical field of an information recording apparatus and an information recording method for recording information such that music information, image information or the like in a recording medium and an information recording medium in which a recording controlling program for recording the information is recorded.

2. Description of the Related Art

In recent years, there is a noticeable trend that a recording capacity is increased in the field of an optical, disc. In response to this, an optical disc for reproduction only (DVD), in which a movie or the like is compressed and recorded, has been prevailing.

In this case, the recording system for recording the information such as a movie or the like (generally, may be referred to as a content) in the optical disc having a high recording capacity is roughly classified into two systems.

As a first recording system, there is a recording system referred to as authoring system independent of a real time. According to this recording system, reproducing control information (also referred to as navigation information in a standard of the DVD).for controlling a reproducing manner of information to be recorded is formed on a hard disk or the like in advance with respect to all of the information in consideration of a relation between the information and the reproducing control information. Then, the formed reproducing control information and the corresponding information substance (content) are packed to be recorded on an optical disc in a disc-at-once system (postscript recording system).

Additionally, as a second recording system, for example, there is a recording system for receiving the information substance distributed by the television broadcast and recording it on the optical disc along a real time as well as generating reproducing control information or the like in association with the information substance and recording it on the optical disc as a file different from the file of the information substance.

In the above described DVD for reproduction only, the reproducing control information and the corresponding information substance, which are generated independent of a real time based on the authoring system among the above described two systems, are recorded. In this case, the information or the like are not directly recorded in the above described DVD for reproduction only, however, the reproducing control information and the information substance are recorded on a master disc for manufacturing the DVD for reproduction only in large quantities, in which the information or the like are recorded. Then, replica processing is performed by using a stamper disc created on the basis of the master disc, so that the above described DVD for reproduction only will be manufactured in large quantity.

On one hand, in recent years, as a recordable DVD, DVD-R (DVD-Recordable, i.e., a DVD capable of recording only once) and DVD-RW (DVD-Re-Recordable, i.e., a DVD capable of recording in plural times) are manufactured. With respect to the DVD-RW, a video recording standard by use of the above described second recording system is established. Alternatively, with respect to the DVD-R, application standard is planned to be established.

As an optical disc which is popular at present, a CD (Compact Disc), a CD-R (CD-Recordable, i.e., a CD capable of recording only once), a CD-RW (CD-Rewritable, i.e., a CD capable of recording in plural times) and the like are manufactured in addition to the above described respective DVDs. It is general that these respective optical discs are required to be configured so as to be reproduced by one information reproducing apparatus to improve compatibility.

However, comparing the above described DVD for reproduction only with the DVD-R and DVD-RW, in the former DVD for reproduction only, the reproducing control information and the information substance are generated independent of a real time and they are packed to be recorded. On the contrary, in the latter DVD-R and DVD-RW, the reproducing control information and the information substance are generated along a real time and they are recorded as an independent file. Therefore, there was a problem such that it is not possible to reproduce the information recorded in the DVD-R and the DVD-RW by using an information reproducing apparatus for reproducing the information on the DVD for reproduction only or it is necessary to make large alteration to the information reproducing apparatus for a DVD for reproduction only in order to reproduce the information recorded in the DVD-R and the DVD-RW.

SUMMARY OF THE INVENTION

The present invention has been made taking the problems into consideration, an object of the invention is to provide an information recording apparatus and an information recording method capable of recording information so that they can be also reproduced by an information reproducing apparatus for an optical disc for reproduction only in which the information are recorded independent of a real time, in the case of recording the information in an optical disc along a real time, and an information recording medium in which a recording control program for recording the information is recorded.

The above object of the present invention can be achieved by an information recording apparatus of the present invention for recording information in a recordable recording medium in conformity to a recording format for a recording medium for reproduction only. In the apparatus, the recording format defines at least unit recording information and managing control information. The unit recording information includes recording information to be reproduced and reproduction control information for controlling a reproduction mode of the recording information. The managing control information controls the reproduction of one or a plurality of said unit recording information. The apparatus is provided with: a first recording device for recording said unit recording information in said recordable recording medium; a generating device for, after said unit recording information is recorded, generating tentative control information corresponding to the recorded unit recording information and being used for forming said managing control information later on to record it in said recordable recording medium; and a second recording device for recording said generated tentative control information in the recordable recording medium every when said unit information is recorded in said recordable recording medium.

According to the present invention, when the unit recording information is recorded, the tentative control information is generated to be temporarily recorded in a recordable recording medium. Therefore, even when a plurality of unit recording information are recorded in the recordable recording medium, by recording original managing control information in later by using the tentative control information having the newest content, it is possible to record the information along with a real time in the recordable recording medium with complying with a recording format for a recording medium for reproduction only which does not presuppose the information recording along with a real time. As a result, it is possible to record information in the recordable recording medium so that it can be also reproduced by an information reproducing apparatus for an optical disc for reproduction only.

In one aspect of the present invention, said first recording device, after said recording information is recorded, records said reproduction control information corresponding to the recording information in an area on said recordable recording medium, said area detected ahead of the recording information. In addition, said second recording device records said tentative control information in an area on said recordable recording medium, said area located between the area in which said recording information is recorded and the area in which said reproduction control information is recorded.

According to this aspect, since the tentative control information is recorded between the recording information which has been completely recorded and the reproduction control information, even if an error occurs during recording the recording information, the tentative control information is recorded in an area on the recordable recording medium in which this error occurs, so that it is possible to record the tentative control information as preventing the tentative control information from being destroyed.

In another aspect of the present invention, the apparatus is further provided with an editorial device for carrying out the editorial processing to change the reproduction content of said recording information which has been already recorded in said recordable recording medium. In the apparatus, the generating device newly generates said tentative control information corresponding to the content of said recording information after the editorial processing. The second recording device records said newly generated tentative control information in a vacant area on said recordable recording medium.

According to this aspect, when the editorial processing is performed with respect to the recording information, which has been already recorded, new tentative control information is generated to be recorded in a vacant area, so that it is possible to record the newest tentative control information and protect it even if the editorial processing is performed during recording the unit recording information.

In further aspect of the present information, the apparatus is further provided with a third recording device for generating said managing control information by using said recorded tentative control information and recording it in said recordable recording medium when the recording of said recording information in said recordable recording medium is terminated.

According to this aspect, when recording of the recording information in the recordable recording medium is terminated, the managing control information is generated by using the tentative control information which has been recorded at that time, so that it is possible to accurately record the managing control information by using the newest tentative control information.

In further aspect of the present invention, said third recording device records said generated managing control information in an area on said recordable recording medium, said area detected ahead of the unit recording information.

According to this aspect, since the managing control information is recorded in the area on the recordable recording medium to be detected ahead of the unit recording information, it is possible to control the reproduction of the recording information by certainly obtaining the managing control information ahead of the reproduction of the recording information.

In further aspect of the present invention, said recording format is based on a DVD video standard, said recordable recording medium is a DVD-R (DVD-Recordable) and further, said unit control information is VTSI (Video Title Set Information) in said recording format and said managing control information is VMGI (Video Manager General Information) in said recording format.

According to this aspect, it is possible to generate the VMGI and record it on the basis of the reproduction control information in the VTS always having the newest content.

The above object of the present invention can be achieved by an information recording method of the present invention for recording information in a recordable recording medium in conformity to a recording format for a recording medium for reproduction only. In the method, the recording format defines at least unit recording information and managing control information. The unit recording information includes recording information to be reproduced and reproduction control information for controlling a reproduction mode of the recording information. The managing control information controls the reproduction of one or a plurality of said unit recording information. The method is provided with: a first recording process for recording said unit recording information in said recordable recording medium; a generating process for, after said unit recording information is recorded, generating tentative control information corresponding to the recorded unit recording information and being used for forming said managing control information later on to record it in said recordable recording medium; and a second recording process for recording said generated tentative control information in the recordable recording medium every when said unit information is recorded in said recordable recording medium.

According to the present invention, when the unit recording information is recorded, the tentative control information is generated to be temporarily recorded in a recordable recording medium. Therefore, even when a plurality of unit recording information are recorded in the recordable recording medium, by recording original managing control information in later by using the tentative control information having the newest content, it is possible to record the information along with a real time in the recordable recording medium with complying with a recording format for a recording medium for reproduction only which does not presuppose the information recording along with a real time. As a result, it is possible to record information in the recordable recording medium so that it can be also reproduced by an information reproducing apparatus for an optical disc for reproduction only.

In one aspect of the present invention, in said first recording process, after said recording information is recorded, said reproduction control information corresponding to the recording information is recorded in an area on said recordable recording medium, said area detected ahead of the recording information. In said second recording process, said tentative control information is recorded in an area on said recordable recording medium, said area located between the area in which said recording information is recorded and the area in which said reproduction control information is recorded.

According to this aspect, since the tentative control information is recorded between the recording information which has been completely recorded and the reproduction control information, even if an error occurs during recording the recording information, the tentative control information is recorded in an area on the recordable recording medium in which this error occurs, so that it is possible to record the tentative control information as preventing the tentative control information from being destroyed.

In another aspect of the present invention, the method is further provided with an editorial process for carrying out the editorial processing to change the reproduction content of said recording information which has been already recorded in said recordable recording medium. In said generating process, said tentative control information corresponding to the content of said recording information is newly generated after the editorial processing. In said second recording process, said newly generated tentative control information is recorded in a vacant area on said recordable recording medium.

According to this aspect, when the editorial processing is performed with respect to the recording information which has been already recorded, the new tentative control information is generated to be recorded in the vacant area, so that it is possible to record the newest tentative control information and protect it even if the editorial processing is performed during recording the unit recording information.

In further aspect of the present invention, the method is further provided with a third recording process for generating said managing control information by using said recorded tentative control information and recording it in said recordable recording medium when the recording of said recording information in said recordable recording medium is terminated.

According to this aspect, when recording of the recording information in the recordable recording medium is terminated, the managing control information is generated by using the tentative control information which has been recorded at that time, so that it is possible to accurately record the managing control information by using the newest tentative control information.

In further aspect of the present invention, in said third recording process, said generated managing control information is recorded in an area on said recordable recording medium, said area detected ahead of the unit recording information.

According to this aspect, since the managing control information is recorded in the area on the recordable recording medium to be detected ahead of the unit recording information, it is possible to control the reproduction of the recording information by certainly obtaining the managing control information ahead of the reproduction of the recording information.

The above object of the present invention can be achieved by an information recording medium of the present invention, in which a recording control program is recorded capable of being read by a recording computer included in an information recording apparatus for recording information in a recordable recording medium in conformity to a recording format for a recording medium for reproduction only. The recording format defines at least unit recording information and managing control information. The unit recording information includes recording information to be reproduced and reproduction control information for controlling a reproduction mode of the recording information, the managing control information controlling the reproduction of one or a plurality of said unit recording information, the recording control program causes the recording computer to function as: a first recording device for recording said unit recording information in said recordable recording medium; a generating device for, after said unit recording information is recorded, generating tentative control information corresponding to the recorded unit recording information and being used for forming said managing control information later on to record it in said recordable recording medium; and a second recording device for recording said generated tentative control information in the recordable recording medium every when said unit information is recorded in said recordable recording medium.

According to the present invention, when the unit recording information is recorded, a recording computer functions so as to generate the tentative control information and temporarily record it in the recordable recording medium. Therefore, even when a plurality of unit recording information are recorded in the recordable recording medium, by recording original managing control information in later by using the tentative control information having the newest content, it is possible to record the information along with a real time in the recordable recording medium with complying with a recording format for a recording medium for reproduction only which does not presuppose the information recording along with a real time. As a result, it is possible to record information in the recordable recording medium so that it can be also reproduced by an information reproducing apparatus for an optical disc for reproduction only.

In one aspect of the present invention, said first recording device, after said recording information is recorded, records said reproduction control information corresponding to the recording information in an area on said recordable recording medium, said area detected ahead of the recording information; and said second recording device records said tentative control information in an area on said recordable recording medium, said area located between the area in which said recording information is recorded and the area in which said reproduction control information is recorded.

According to this aspect, since the recording computer functions so as to record the tentative control information between the recording information which has been completely recorded and the reproduction control information, even if an error occurs during recording the recording information, the tentative control information is recorded in an area on the recordable recording medium in which this error occurs, so that it is possible to record the tentative control information as preventing the tentative control information from being destroyed.

In another aspect of the present invention, the recording control program causes the recording computer to further function as an editorial device for carrying out the editorial processing to change the reproduction content of said recording information which has been already recorded in said recordable recording medium, wherein said generating device newly generates said tentative control information corresponding to the content of said recording information after the editorial processing; and said second recording device records said newly generated tentative control information in a vacant area on said recordable recording medium.

According to this aspect, when recording of the recording information in the recordable recording medium is terminated, the recording computer functions so as to generate the managing control information by using the tentative control information which has been recorded at that time, so that it is possible to accurately record the managing control information by using the newest tentative control information.

In further aspect of the present invention, the recording control program causes the recording computer to further function as a third recording device for generating said managing control information by using said recorded tentative control information and recording it in said recordable recording medium when the recording of said recording information in said recordable recording medium is terminated.

According to this aspect, when recording of the recording information in the recordable recording medium is terminated, the managing control information is generated by using the tentative control information which has been recorded at that time, so that it is possible to accurately record the managing control information by using the newest tentative control information.

In further aspect, said third recording device records said generated managing control information in an area on said recordable recording medium, said area detected ahead of the unit recording information.

According to this aspect, since the recording computer functions so as to record the managing control information in the area on the recordable recording medium to be detected ahead of the unit recording information, it is possible to control, the reproduction of the recording information by certainly obtaining the managing control information ahead of the reproduction of the recording information.

The above object of the present invention can be achieved by a computer data signal of the present invention embodied in a carrier wave and representing a series of instructions which cause a computer to perform steps to execute a recording control process in an information recording apparatus for recording information in a recordable recording medium in conformity to a recording format for a recording medium for reproduction only. The recording format defines at least unit recording information and managing control information. The unit recording information includes recording information to be reproduced and reproduction control information for controlling a reproduction mode of the recording information. The managing control information controls the reproduction of one or a plurality of said unit recording information. The steps are provide with: a first recording step for recording said unit recording information in said recordable recording medium; a generating step for, after said unit recording information is recorded, generating tentative control information corresponding to the recorded unit recording information and being used for forming said managing control information later on to record it in said recordable recording medium; and a second recording step for recording said generated tentative control information in the recordable recording medium every when said unit information is recorded in said recordable recording medium.

According to the present invention, when the unit recording information is recorded, a computer functions so as to generate the tentative control information and temporarily record it in the recordable recording medium. Therefore, even when a plurality of unit recording information are recorded in the recordable recording medium, by recording original managing control information in later by using the tentative control information having the newest content, it is possible to record the information along with a real time in the recordable recording medium with complying with a recording format for a recording medium for reproduction only which does not presuppose the information recording along with a real time. As a result, it is possible to record information in the recordable recording medium so that it can be also reproduced by an information reproducing apparatus for an optical disc for reproduction only.

BRIEF DESCRIPTION OF THE DRAWINGS.

FIG. 11 is a diagram for illustrating transitions of the managing data to be recorded in the process of the information recording processing according to the embodiment.

DESCRIPTION OF THE PREFERRED EMBODIMENTS

A preferred embodiment of the present invention will be explained with reference to the drawings.

The embodiment to be explained below is applied to an information apparatus, which is on the code of a DVD video standard and records the recording information such as an image or the like in a DVD-R as a recordable recording medium. The DVD video standard is a recording format standard of information of a movie or the like in a DVD for reproduction only (a corresponding standard name is "JIS X6241 120 mm DVD reproduction only disc standard").

(I) Embodiment of DVD Video Standard

At first, before explaining the embodiment specifically, the above described DVD video standard to be supported as a recording format in the information recording apparatus of the embodiment will be schematically explained with reference to FIGS. 1 to 4.

Figure 1:
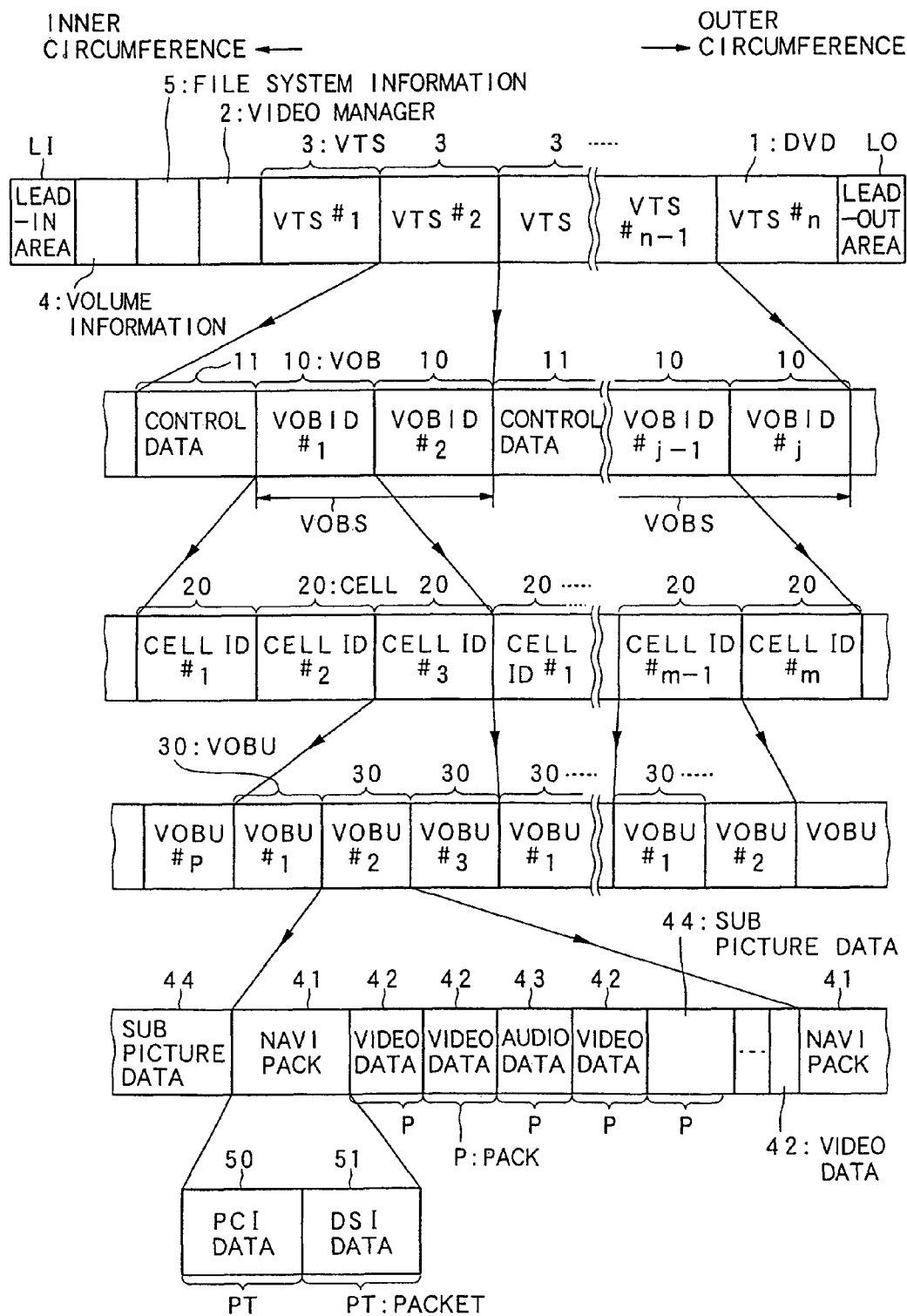
FIG. 1 is a diagram (I) for illustrating a physical recording format in a DVD video standard.
Figure 2:
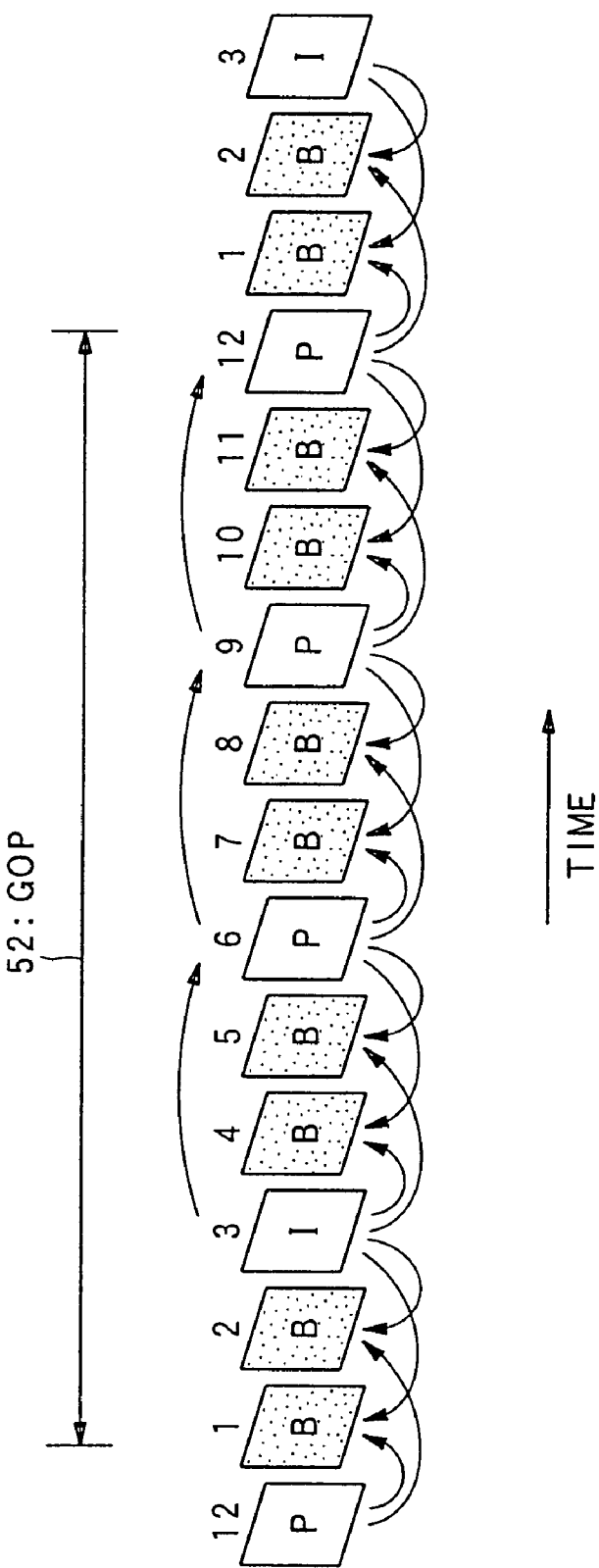
FIG. 2 is a diagram for illustrating a constitution of a GOP in the DVD video standard.
Figure 3:
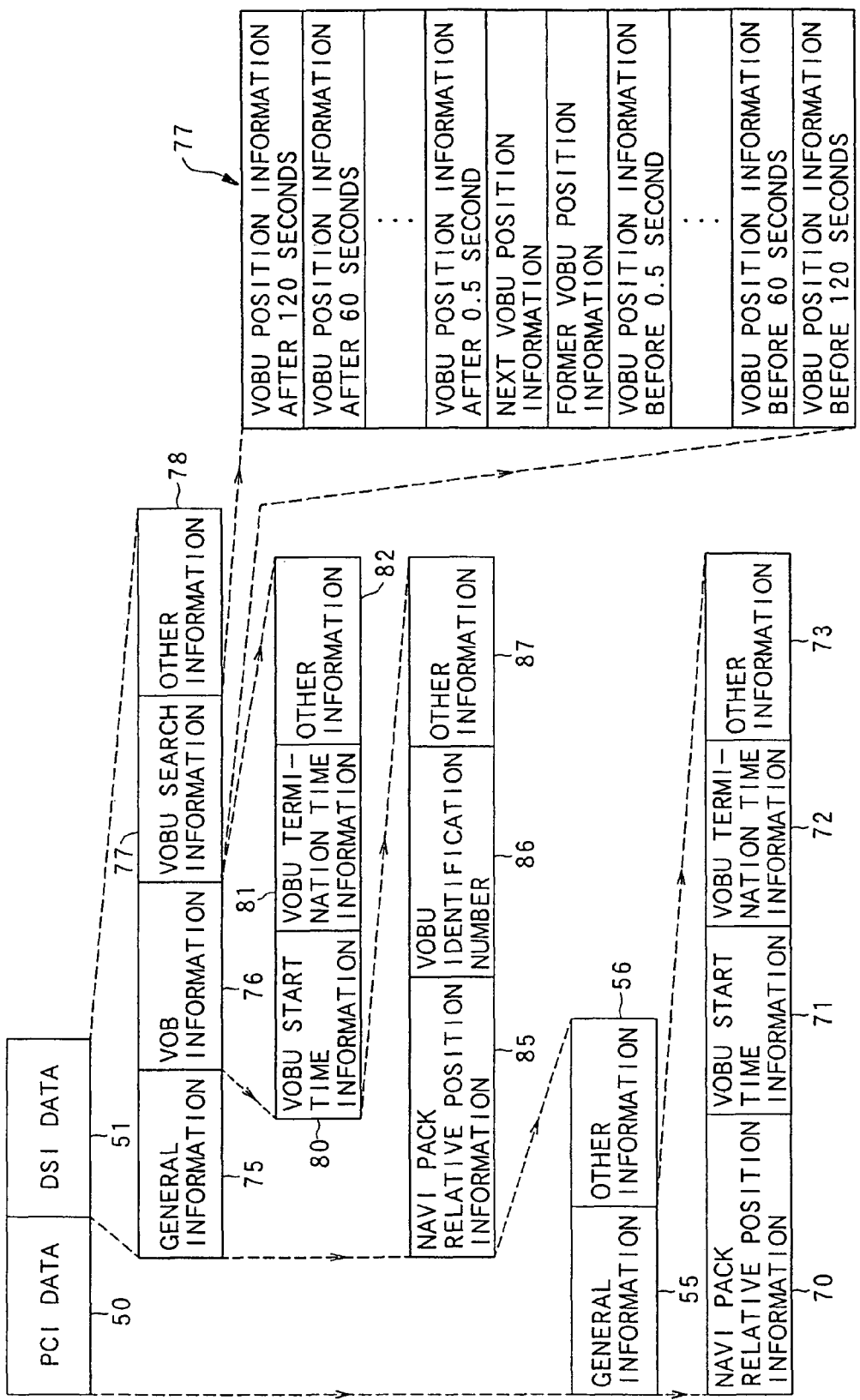
FIG. 3 is a diagram (II) for illustrating a physical recording format in the DVD video standard.
Figure 4:
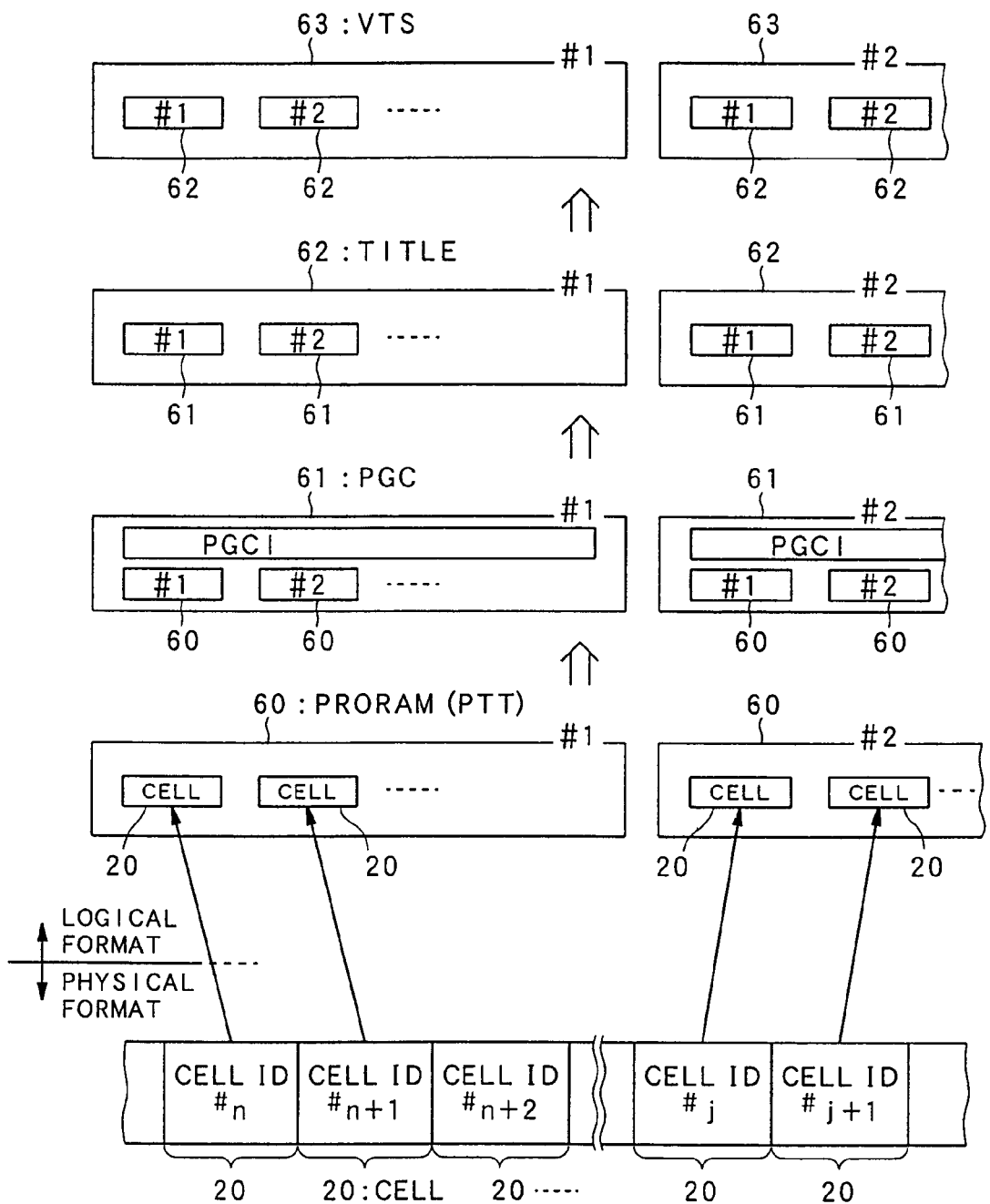
FIG. 4 is a diagram for illustrating a logical format in the DVD video standard.

Alternatively, FIG. 1 and FIG. 3 illustrate a physical recording format in the DVD video standard. FIG. 2 illustrates a constitution of a GOP (Group Of Picture) in the DVD video standard. FIG. 4 illustrates a logical format in the DVD video standard.

As shown in FIG. 1, a DVD 1, in which recording information is recorded based on the DVD video standard, has a lead-in area L1 in its innermost circumference as well as has a lead-out area L0 in its outermost circumference. Between the innermost circumference and the outermost circumference, image information and audio information are divided into a plurality of Video Title Sets (VTS) 3 (VTS #1 to VTS #n) having an ID (identification) number, respectively to be recorded.

In this case, the VTS means a set (a pack) packing relevant titles whose attributions such as the number of sound information and sub-picture information (i.e., the information of a sub-picture such as a subtitle of a movie or the like), a specification, and a corresponding language are identical. The titles are works such as movies, which producers intend to present to viewers. More specifically, for example, a plurality of movies, which correspond to one movie, having scripts of different languages and the like may be recorded in different titles respectively. Further, a movie of a theater version and the corresponding movie of a special version may be recorded in different titles respectively.

Alternatively, just before an area in which a VTS 3 is recorded, a video manager 2 is recorded. VMGI (Video Manager Information) to be recorded as this video manager 2, for example, includes the information involving the whole of the image information and the audio information to be recorded in the DVD 1. For example, the information includes menus indicating the names of respective titles, the information for preventing a illegal copy or an access table for accessing respective titles and backup information for these information and the like.

Further, between the video manager 2 and the lead-in area L1, volume information 4 for identifying the entire information recorded in the DVD 1 and file system information 5 indicating a file configuration of data in the video manager 2 and each VTS 3.

A piece of VTS 3 is divided into a plurality of VOB 10 having ID numbers, respectively, to be recorded with control data 11 as a head. A portion composed of a plurality of VOB 10 is referred to as a VOB set (VOBS). In order to distinguish the control data 11 as other data composing the VTS 3 and a plurality of VOB 10 comprising an substance of the image information and the audio information, the substantial portion is referred to as a VOB set.

In the control data 11 to be recorded in a head of the VTS 3, the information such as PGCI (Program Chain Information) or the like comprising various information with regard to a program chain, which is a logical segment made by combining a plurality of cells (a cell will be described later) and the backup information for it are recorded as VTSI (Video Title Set Information). Alternatively, in each VOB 10, an substantial portion of the image information and the audio information (i.e., the image or the audio itself other than the control information) is recorded in addition to the control information.

Further, one piece of VOB 10 is composed of a plurality of cells 20 having an ID number, respectively. One piece of VOB 10 must be composed of integral multiples of the cells 20, so that one cell 20 is not shared by two pieces of VOB 10.

One cell 20 is composed of a plurality of VOB units (VOBU) 30 having an ID number, respectively. The VOB unit 30 means unit information including each of the image information, the audio information and the sub picture information.

Then, one VOB unit 30 is composed of: a navigation pack 41 (hereinafter, simply referred to as a navi pack) in which the control information to control the data or the like included in the VOB unit 30 is stored; video data 42 as the image information; audio data 43 as the audio information and sub picture data 44 as the sub picture information. Only the image data is recorded as the video data 42, and only the audio data is recorded as the audio data 43. Alternatively, as the sub picture data 44, Only graphic data such as characters, a graphic as the sub picture are recorded. It is defined in the standard that there are eight kinds of audios capable of being recorded in the DVD 1 and there are thirty two kinds of the sub pictures capable of being recorded.

Alternatively, the reproduction time (the reproduction time corresponding to the data recorded between one navi pack 41 and a navi pack 41 adjacent to this one navi pack 41) in response to one VOB unit 30 is recorded so as to have a length in the range of not less than 0.4 second and not more than 1.0 second. Therefore, the navi pack 41 is definitely detected one time in the range of 0.4 second to 1.0 second upon reproduction.

Additionally, in one VOB unit 30, the navi pack 41 should be located at a head thereof. However, each of the video data 42, the audio data 43 and the sub picture data 44 is not needed to be located in the VOB unit 30. Alternatively, if they are located in the VOB unit 30, the number and the order thereof may be arbitrarily set.

A segment of each of the video data 42, the audio data 43 and the sub picture data 44 shown in FIG. 1 is generally referred to as a pack P.

In other words, the video data 42, the audio data 43 and the sub picture data 44 are respectively divided into a pack P to be recorded in one VOB unit 30. Further, the pack P in which the video data 42 is recorded is referred to as a video pack, the pack P in which the audio data 43 is recorded is referred to as an audio pack, and the pack P in which the sub picture data 44 is recorded is referred to as a sub picture pack. Further, read-out starting time information referred to as a SCR (System Clock Reference) is recorded in a back header to be recorded in the head of each pack P. The SCR indicates a read-out start time on a reproduction time axis when the input in respective buffers should be started by reading out the data included in each pack P from a track buffer in the information reproducing apparatus for reproducing the information recorded in the DVD 1. Alternatively, the video data 42, the audio data 43 or the sub picture data 44 is normally recorded in the above described each pack P for every packet as a recording unit obtained by further subsectioning the pack P. However, according to the DVD 1 of the present embodiment, one pack P is generally composed of one packet.

Finally, the navi pack 41 is composed of DSI data 51 comprising retrieval information for retrieving the image, the audio or the like to be reproduced and displayed (specifically, an address or the like on the DVD 1 in which the image, the audio or the like to be reproduced and displayed), and PCI data 50 comprising the information in relation to the reproduction displaying control upon displaying the image or the audio retrieved on the basis of the DSI data 51. The DSI data 51 and the PCI data 50 compose a DSI packet and a PCI packet as a packet PT, respectively, then, they are recorded.

Further, all of the video data 42 included in one VOB unit 30 are composed of one or plural Groups of Picture (GOP).

The DSI data 51 and the PCI, data 50 will be described in detail later.

Alternatively, the PCI data 50 includes highlight information that defines the indication and the operation when the viewer selects a certain alternative item. Depending on the highlight information, for example, the change of the screen display with respect to the item selection in an image which displays the items to be selected by the viewer (menu screen), a display position to be changed in accordance with the selection, a command for the selected item (i.e., a command for indicating the operation to be carried out to the selected item) and the like are set.

The image information for displaying a frame, a selection button and the like, which are necessary for composing a menu image and displaying it, is recorded as the sub picture data 44 as the above described sub image information.

Additionally, the above described GOP is the minimum image unit by itself, which is defined in the MPEG (Moving Picture Expert Group) 2 system as an image compression system employed upon recording the image information in the DVD 1 of the present invention. In a head of each GOP, reproduction display time information referred to as a PTS (Presentation Time Stamp) is recorded to indicate the reproduction time on the reproduction time axis when the video data 42 included in the GOP should be displayed.

The summary of the MPEG 2 system will be explained below. Generally, there are many cases such that frame images located back and forth of one piece of frame image are similar each other and have a mutual relation in continuous frame images. The MPEG 2 system has views upon the point. In the MPEG 2 system, based on a plurality of frame images to be transferred at interval of some frames, another frame image existing among the plurality of frame images is generated by an interpolation calculation on the basis of a moving vector or the like of an original image. In the case, when recording another frame image, only by recording the information with regard to the difference among the plurality of frame images and the moving vector, it becomes possible to predict another frame image with reference to the recorded information and to reproduce another frame image upon reproduction. Therefore, it becomes possible to compress and record the image.

Further, the summary of the above described GOP will be explained with reference to FIG. 2. FIG. 2 illustrates an example of a plurality of frame images composing one GOP. FIG. 2 shows that one GOP 52 is composed of twelve pieces of frame images (the number of frame images included in one GOP 52 is not fixed in the MPEG 2 system). In the frame images, a frame image indicated by a reference numeral "I" is referred to as an I picture (Intra-coded picture) and it means a frame image capable of reproducing a complete frame image only by its own image. Alternatively, a frame image indicated by a reference numeral "P" is referred to as a P picture (Predictive-coded picture) and it means a predictive image generated by decrypting the difference among the compensated and reproduced predictive images or the like on the basis of the decrypted I picture or another P picture. Alternatively, a frame image indicated by a reference numeral "B" is referred to as a B picture (Bidirectionally predictive-coded picture) and it means a predictive image reproduced by using not only the decrypted I picture or P picture but also a future I picture or a future P picture recorded in an optical disc or the like for prediction. In FIG. 2, a predictive relation (interpolation relation) among respective pictures is represented by an arrow.

Alternatively, a general MPEG 2 system used in the DVD 1.according to the present invention employs a variable rate system in which the data amount included in each GOP 52 is not fixed. In other words, respective pictures included in one GOP. 52 correspond to a moving image with rapid movement, so that in the case that the mutual relation between respective pictures is small, the data amount for composing respective pictures becomes large. Accordingly, the data amount included in one GOP 52 also becomes large. On the other hand, respective pictures included in one GOP 52 correspond to a moving image with less movement, so that in the case that the mutual relation between respective pictures is large, the data amount for composing respective pictures becomes small and the data amount included in one GOP 52 also becomes small.

In a recording format having a hierarchical structure described in the above with reference to FIG. 1, respective segments are freely set by a manufacture in accordance with his or her intention to be recorded. By reproducing the information on the basis of a logical structure to be explained later for every segment, it is possible to carry out various and varied reproduction.

A physical data structure of the above described DSI data 51 and the PCI data 50 will be described with reference to FIG. 3.

At first, as shown in FIG. 3, the PCI data 50 is comprised of general information 55 as the PCI data 50 itself and the other information 56 as the rest information.

Further, the general information 55 is composed of: navi pack relative position information 70 as relative recording address information from a head of the VOB 10 of the above described navi pack 41; VOBU reproduction start time information 71 for indicating a reproduction start time on the reproduction time axis of the VOB unit 30 in which this navi pack 41 is included; VOBU reproduction termination time information 72 for indicating a reproduction termination time on the reproduction time axis of the VOB unit 30; and other information 73 as the rest information.

The DSI data 51 is comprised of: general information 75 as the DSI data 51 itself; VOB information 76 as the information relevant to the VOB 10 to which the navi pack 41 belongs; VOBU search information 77 for indicating recording position on the DVD 1 of other VOB units 30 to be reproduced before and after the VOB unit 30 to which the navi pack 41 belongs is reproduced, and other information 78 as the rest information.

Then, the general information 75 is comprised of: navi pack relative position information 85 similar to the above described navi pack relative position information 70, VOBU identification number 86 for identifying the VOB unit 30 to which the navi pack 41 belongs, and other information 87 as the rest information.

Further, the VOB information 76 is comprised of: VOBU reproduction start time information 80 for indicating the reproduction start time on the reproduction time axis of the VOB 10 to which VOB unit 30 including the navi pack 41 belongs; VOBU reproduction termination time information 81 for indicating the reproduction termination time on the reproduction time axis of the VOB 10; and other information 82 as the rest information.

Still further, as the VOBU search information 77, as shown in FIG. 3, the position information is included as a list to indicate the position information for indicating a recording position on the DVD 1 of the VOB unit 30 next to the VOB unit 30 to which the navi pack 41 belongs, and a recording position on the DVD 1 of the VOB unit 30 one previous to the VOB unit 30 to which the navi pack 41 belongs, and the position information for indicating recording positions on the DVD 1 of other VOB units 30 to be reproduced in the range of 120 seconds after the start time of the VOB unit 30 to 120 seconds before the start time of the VOB unit 30.

A logical format (a logical structure) obtained by combining the information recorded by the physical segments shown in FIG. 1 or FIG. 3 will be explained with reference to FIG. 4. Alternatively, in the logical format shown in FIG. 4, the information is not actually recorded on the DVD 1, but the information (the access information, the time information or the like) for combining each data (specifically, the cell 20) shown in FIG. 1 and reproducing it in the logical structure shown in FIG. 4 is recorded on the DVD 1, specifically, in control data 11.

For a clear explanation, the explanation will be given from a lower hierarchy in FIG. 4. By selecting a plurality of cells 20 and combining them in the physical structure explained above in FIG. 1, one program 60 is logically composed on the basis of the manufacture's intention. The program 60 is also the minimum logical unit capable of being accessed in such a manner that a system controller in the above described information reproducing apparatus identifies the segment and uses a command. Alternatively, the manufacture may also define the program 60 as the minimum unit such that the viewer can freely select one cell 20 or packed plural cells 20 and views them. The unit is referred to as a PTT (Part of Title).

Alternatively, since one program 60 is logically composed by selecting a plurality of cells 20, it is also possible to use one cell 20 in a plurality of programs 60, in other words, so called redundant use of the cell 20 such that one cell 20 is reproduced in different and plural programs 60 is possible for the manufacturer.

The number of one cell 20 is treated as a cell ID number (it is represented by a cell ID# in FIG. 1) upon treating the cell 20 in the physical format shown in FIG. 1. On the other hand, the number of one cell 20 is treated as a cell number in the order of the description in a PGCI to be described later upon treating the cell 20 in the physical format shown in FIG. 4.

One PGC (Program Chain) 61 is logically composed on the basis of the manufacture's intention by combining a plurality of programs 60. In the unit of the PGC 61, the above described PGCI is defined. The present PGCI includes: a reproduction order of the cells 20 for each program 60 upon reproducing respective programs 60 (a specific program number is assigned for every program 60 by this reproduction order); an address as a recording position on the DVD 1 of respective cells 20; the number of a head cell 20 to be reproduced in one program 60; a reproduction system of respective programs 60; and various commands (a command capable of being designated by the manufacture for every PGC 61 or every cell 20). When recording the information in the DVD 1 according to the present embodiment, the manufacturer selects any one of reproduction methods among a normal reproduction, a random reproduction and a shuffle reproduction for every PGC 60 to reproduce the program 60 upon reproduction. The random reproduction is performed by using random numbers, so that the same program 60 may be possibly reproduced in plural times. The shuffle reproduction is also a random reproduction using random numbers similar to the above random reproduction, however, the program 60 is reproduced only once so that the same program 60 is not reproduced in plural times.

Alternatively, the recording position of the PGCI on the DVD 1 is located within the control data 11 (refer to FIG. 1) as described above. However, in the case that the PGCI is related to a menu within the video manager 2, the recording position of the PGCI is located within the control data (not shown) included in the video manager 2.

Alternatively, one PGCI 61 may include the data such as a substantial image, an audio and the like as a combination of the programs 60 (in other words, a combination of the cells 20) in addition to the above described PGCI.

Further, in one PGC 61, it is also possible to redundantly use the cell 20 as described in the explanation of the program 60 (namely, the same sell 20 is used by the different PGC 61). Alternatively, the manufacturer is capable of selecting a method (a method for reproducing uncontinuously arranged cells) for reproducing the cells 20 regardless of the order that the cells 20 (for example, previously reproducing the cell 20 recorded lately or the like) are stored in the DVD 1 in addition to a method for reproducing the cells 20 in the order that they are stored in the DVD 1 (a method for reproducing continuously arranged cells) with respect to the cell 20 to be used.

One title 62 is logically composed of one or a plurality of PGC 61. For example, the title 62 is a unit corresponding to one piece of movie and the title 62 is information which the manufacturer wishes to provide to the viewer of the DVD 1.

Then, one VTS 63 is logically composed of one or plural titles 62. This titles 62 included in the VTS 63 have common attribute, respectively. For example, with respect to one and the same movie, the movies having different languages correspond to respective titles 62. Alternatively, the information corresponding to one VTS 63 shown in FIG. 4 corresponds to the information included in one VTS 3 shown in FIG. 1. In other words, all, information logically included in the VTS 63 shown in FIG. 4 are recorded in the DVD 1 as one VTS 3.

On the basis of the above described logical format, the manufacturer designates the information segmented in the physical structure, so that the title (a movie or the like) to be viewed by the viewer is formed.

(II) Embodiment of DVD-R

A DVD-R according to the present embodiment, in which the recording information is recorded by the information recording apparatus, will be described with reference to FIG. 5.

Figure 5:
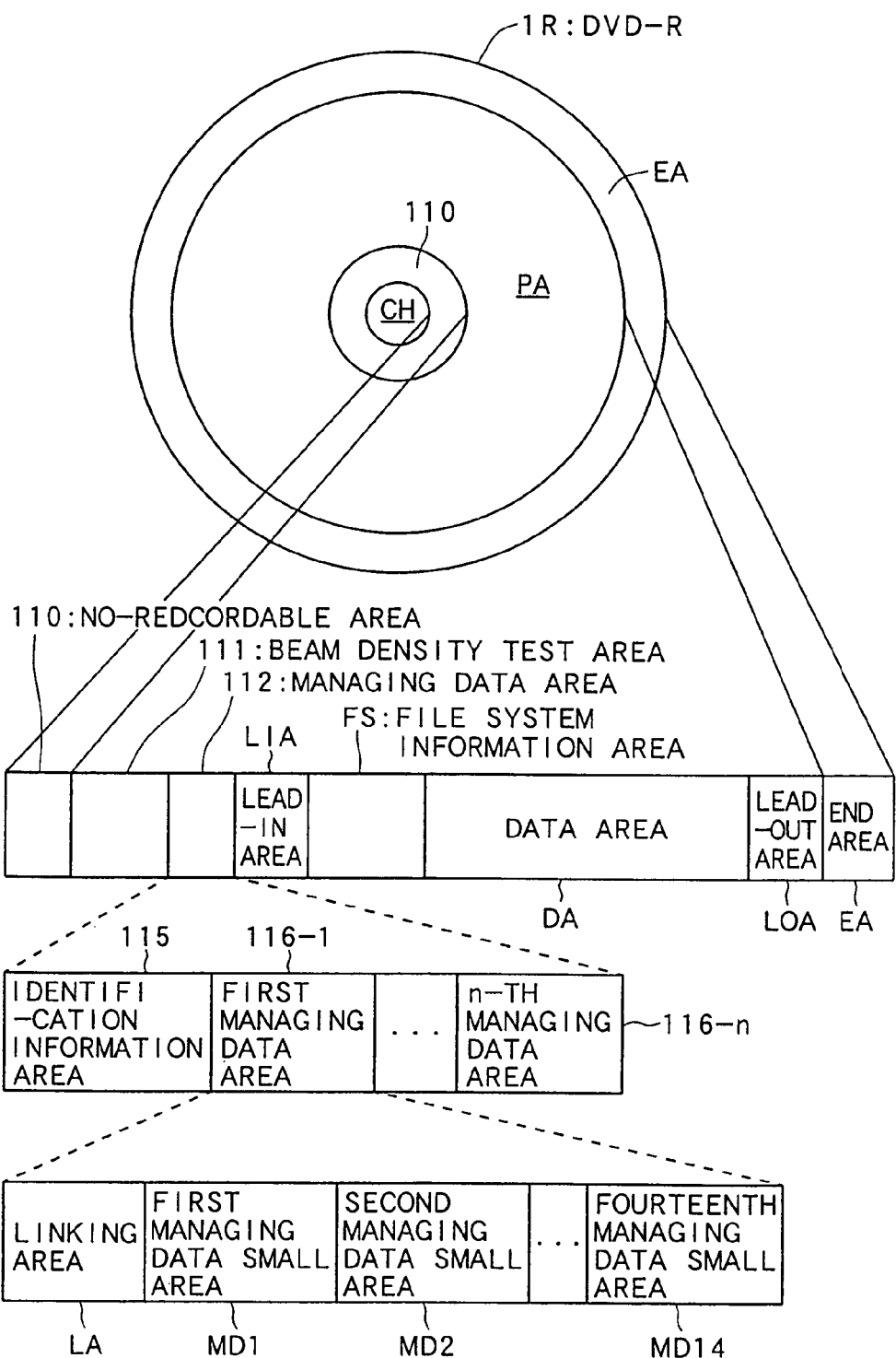
FIG. 5 is a diagram for illustrating a plan external view and a physical recording format of a DVD-R.

FIG. 5 illustrates a plan external view and a physical recording format of the DVD-R according to the present embodiment.

The DVD-R according to the present embodiment comprises an optical disc capable of recording only once with a color membrane as a recording membrane. In a plan external view, the DVD-R has a center hall CH at a center thereof to fix the DVD-R in a spindle motor for rotating the DVD-R in the information reproducing apparatus or, the information recording apparatus. The DVD-R further has a no-redcordable area 110 not capable of recording the recording information from the inside thereof to the inner circumference, a redcordable area PA capable of recording the recording information and an end area EA not capable of recording the recording information in the outer circumference side.

Further, the redcordable area PA is composed of: a beam density test area 111 in which the test information for setting the density of the optical beam to be used for recording the recording information is recorded; a managing data area 112 in which the data of the set optical beam density and the managing data to be described later in the recording process are recorded; a lead-in area LIA in which the start information or the like to be read out upon starting the reproduction of the recorded recording information are recorded in the recording process of the recording information; a file system information area FS in which the file system information is recorded as the information for indicating a file structure in the recording information; a data area DA in which the recording information is recorded in practice; and a lead-out area LOA in which the termination information or the like to be read out upon terminating the reproduction of the recorded recording information are recorded in the recording process of the recording information.

Alternatively, the managing data area 112 is composed of an identification information area 115 in which the identification information for identifying the DVD-R 1R itself from other DVD-Rs is recorded, and a first managing data area $116_{-1}$ to an n-th managing data area $116_{-n}$ in which the managing data necessary in the recording process of the recording information to be described later is recorded every when it is updates. The maximum value of the above n is "699".

Further, one managing data area 116 is composed of a linking area LA in which the information with regard to the connection to the adjoining managing data area is recorded and fourteen pieces of managing data small areas MD, namely, a first managing data small area MD1 to a fourteenth managing data small area MD14 in which the information composing a portion of respective managing data areas 116 is recorded, respectively, as described later.

(III) Embodiment of Information Recording/Reproducing Apparatus

An information recording/reproducing apparatus for recording the recording information along with a real time in a DVD-R 1R or a DVD-RW based on the above described DVD video standard as well as reproducing the recorded information from the DVD-R 1R or the DVD-RW according to the present embodiment will be described with reference to FIGS. 6 to 9.

Figure 6:
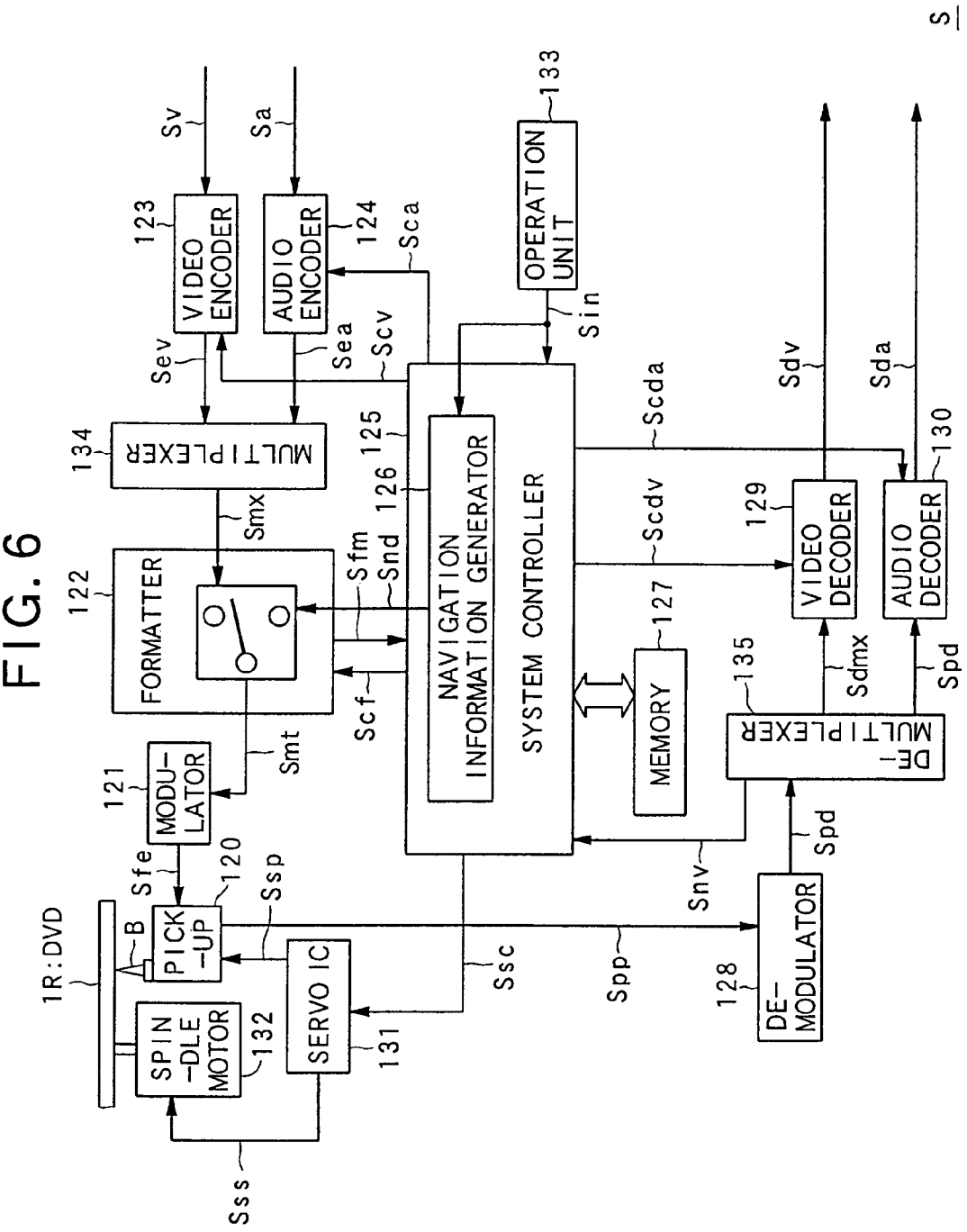
FIG. 6 is a block diagram for illustrating a schematic constitution of an information recording reproducing apparatus according to an embodiment of the present invention.
Figure 7:
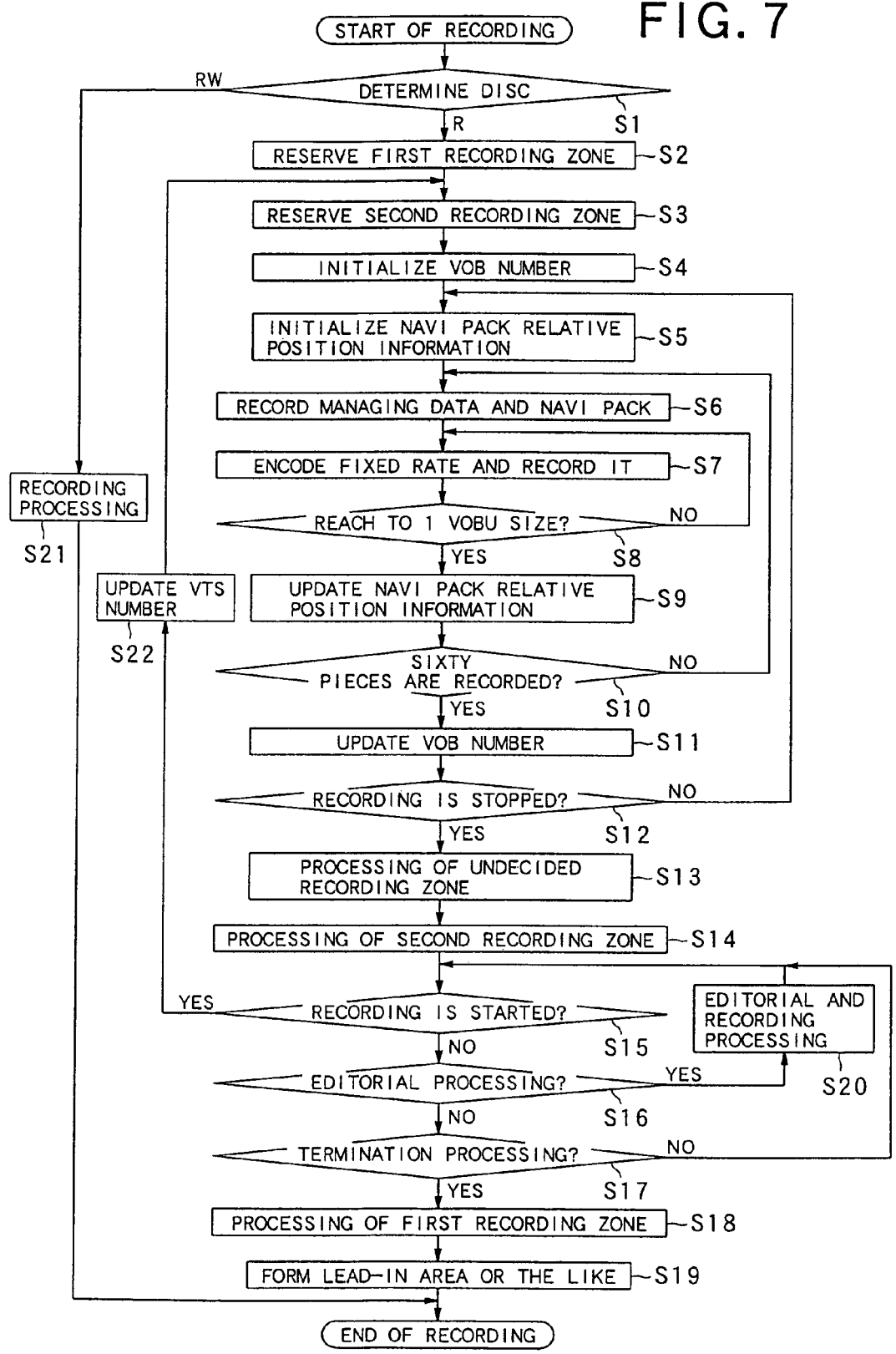
FIG. 7 is a flow chart for illustrating the information recording processing according to the embodiment.
Figure 8:
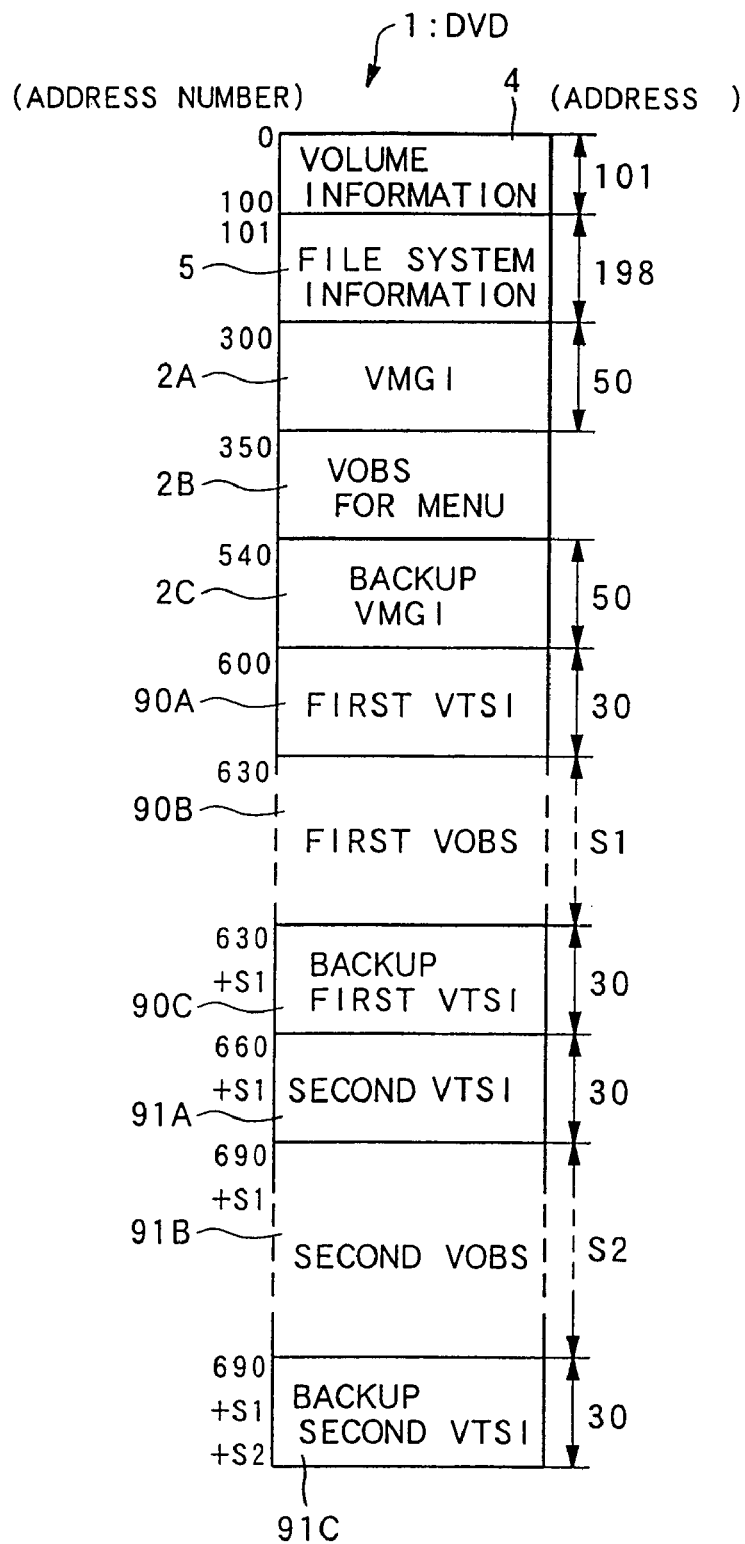
FIG. 8 is a diagram for illustrating a recording mode of the DVD corresponding to the information recording processing according to the embodiment.
Figure 9:
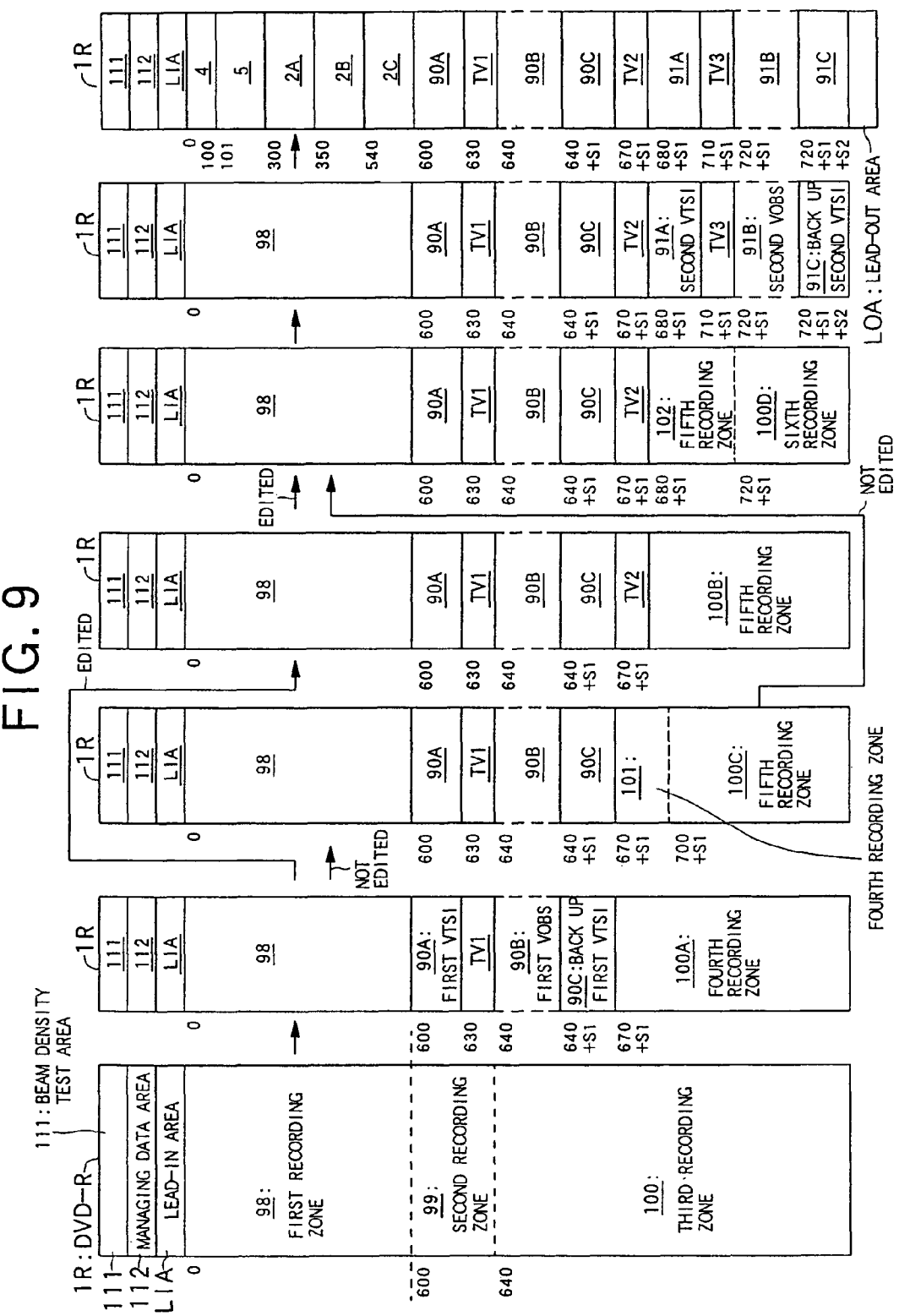
FIG. 9 is a diagram for illustrating the change of a DVD-R in the process of the information recording processing according to the embodiment.
Figure 10:
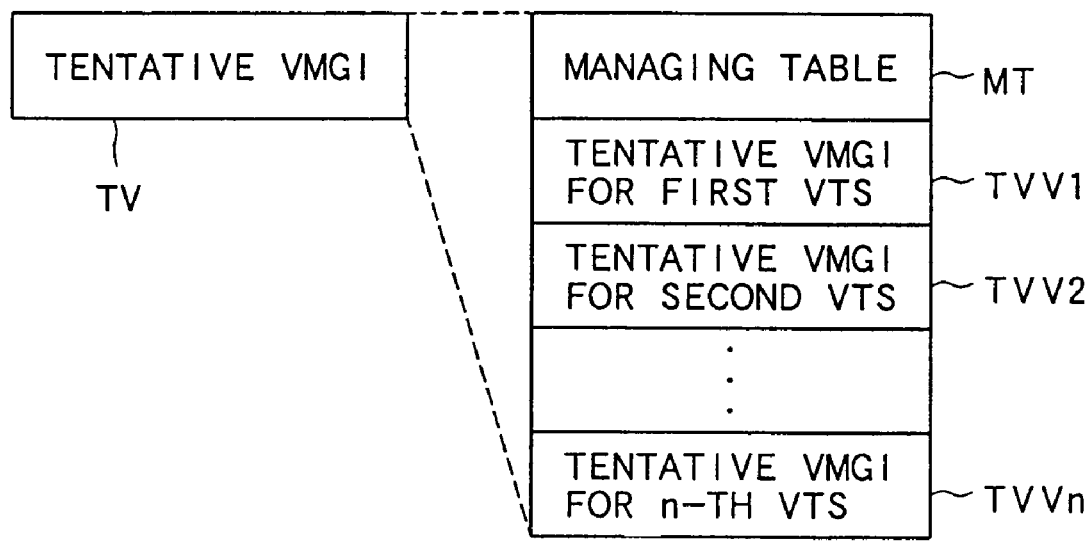
FIG. 10 is a diagram for illustrating a constitution of a tentative VMGI according to the embodiment.

FIG. 6 is a block diagram for illustrating a schematic constitution of an information recording reproducing apparatus according to an embodiment, FIG. 7 is a flowchart for illustrating the information recording processing according to the embodiment, FIG. 8 is a diagram for illustrating a recording mode of the DVD corresponding to the information recording processing according to the embodiment, FIG. 9 is a diagram for illustrating the change of a DVD-R 1R in the process of the information recording processing according to the embodiment, FIG. 10 is a diagram for illustrating a constitution of a tentative VMGI to be described in later according to the embodiment and FIG. 11 is a diagram for illustrating transitions of the foregoing managing data to be recorded in the process of the information recording processing according to the embodiment.

As shown in FIG. 6, an information recording reproducing apparatus S according to the present embodiment is provided with a pickup 120 as a first recording device, a second recording device and a third recording device, a modulation unit 121, a formatter 122, a video encoder 123, an audio encoder 124, a system controller 125 as a generating device and an editorial device, a memory 127, a demodulation unit 128, a video decoder 129, an audio decoder 130, a servo IC (Integrated Circuit) 131, a spindle motor 132, an operating unit 133, a multiplexer 134 and a demultiplexer 135. Alternatively, the system controller 125 is provided with a navigation information generator 126 for generating the above described navi pack 41 or the like.

The schematic operation of respective units will be explained.

At first, the spindle motor 132 rotates the loaded DVD-R 1R in a preset rotation speed on the basis of a spindle control signal Sss from the servo IC 131.

On one hand, video information Sv as the recording information to be recorded in a data area DA of the DVD-R 1R is inputted in the video encoder 123 after it is inputted from the outside.

Then, the video encoder 123 executes an encoding processing with a fixed encoding rate set in advance with respect to the video information Sv on the basis of the control signal Scv from the system controller 125, generates an encoded video signal Sev and outputs it to the multiplexer 134. Specifically, for example, the encoding processing is one in the above described MPEG 2 system and using an encoding rate such that the reproduction time of one VOB unit 30 is 0.5 second. The 0.5 second is a time corresponding to the reproduction time of fifteen video frames in the NTSC (National Television System Committee) system.

On the other hand, audio information Sa as the recording information to be recorded in the data area DA of the DVD-R 1R is inputted in the audio encoder 124 after it is inputted from the outside.

Then, the audio encoder 124 executes an encoding processing with a fixed encoding rate set in advance with respect to the audio information Sa on the basis of the control signal Sca from the system controller 125, generates an encoded audio signal Sea and outputs it to the multiplexer 134. Specifically, for example, the encoding processing is one in the above described MPEG 2 system and using an encoding rate such that the reproduction time of one VOB unit 30 is 0.5 second as in the case of the vide information Sv.

Therefore, the multiplexer 134 superposes (or multiplexes) the image information and the audio information included in the encoded video signal Sev by a predetermined processing, generates a superposed signal Smx and outputs it to the formatter 122.

The multiplexer 134 makes the above described encoded audio, signal Sea pass as it is and makes it into the superpose signal Smx.

The formatter 122 combines navigation information signal Snd to be described later from the navigation information generator 126 and the above described superposed signal Smx so as to be a system of the physical format shown in FIG. 1 or FIG. 3 on the basis of a control signal Scf from the system controller 125. Then, the formatter 122 generates a format signal Smt and outputs it to the modulation unit 121.

Respective recording information to be inputted in the formatter 122 as the superposed signal Smx are outputted to the system controller 125 as recording information signal Sfm in a predetermined timing so that they are provided for generating the above navigation information in the navigation information generator 126.

Then, the modulation unit 121 executes a predetermined modulation processing (specifically, for example, so-called 8-16 modulation processing) to the format signal Smt, generates a modulation signal Sfe and outputs it to the pickup 120.

Therefore, the pickup 120 generates an optical beam B, of which density is modulated by the modulation signal Sfe, forms a pit corresponding to the above navigation information included in the modulation signal Sfe, and respective recording information on the information track by irradiating the generated optical beam B on the information track within the information recording surface (not shown) of, the DVD-R 1R. Then, the navigation information and respective recording information are recorded on the DVD-R 1R in a system of the physical format shown in FIG. 1 and FIG. 3.

A deviation in a vertical direction with respect to the above information recording surface and a horizontal direction with respect to the above information recording surface between a converge position of the optical beam B and the above information track is solved by moving an objective lens (not illustrated) in the pickup 120 (an objective lens for converging the optical beam B) in the above horizontal direction and the above vertical direction on the basis of the pickup servo signal Ssp to be outputted from the servo IC 131, namely, by performing focus servo control and tracking servo control.

Therefore, the servo IC 131 generates the above spindle control signal Sss and the pickup servo signal Ssp on the basis of a control signal Ssc form the system controller 125 to output them to the spindle motor 132 and the pickup 120, respectively.

On one hand, in the case of reproducing the recording information or the like recorded in the DVD-R 1R in advance, the pickup 120 generates an optical beam B with a predetermined density for reproduction to be irradiated to the information track on which the above pit is formed. Then, on the basis of this reflected light, the pickup 120 generates a detection signal Spp corresponding to the recording information or the like to output it to the demodulation unit 128.

Therefore, the demodulation unit 128 executes the demodulation processing in association with the demodulation processing in the above modulation unit 121 to the detection signal Spp, generates the demodulation signal Spd and outputs it to the demultiplexer 135.

Then, the demultiplexer 135 separates the image information and the audio information included in the video information when the demodulation signal Spd includes the video information, so that it generates a separated signal Sdmx to output it to the video decoder 129.

On one hand, in the case that the demodulation signal Spd includes the audio information, the demultiplexer 135 makes the demodulation signal Spd pass as it is and outputs it to the audio decoder 130.

The video decoder 129 executes the decoding processing corresponding to the encoding processing of the fixed encoding rate in the above video encoder 123 to the separated signal Sdmx on the basis of a control signal Scdv from the system controller 125, generates a decoding video signal Sdv and outputs it to a monitor (not shown) or the like in the outside.

Further, the audio decoder 130 executes the decoding processing corresponding to the encoding processing of the fixed encoding rate in the above audio encoder 124 to the modulation signal Spd including the audio information on the basis of a control signal Scda from the system controller 125, generates a decoding video signal Sda and outputs it to an amplifier (not shown) or the like in the outside.

On the other hand, the operating unit 133 generates an operational signal Sin corresponding to the operation and outputs it to the system controller 125 when the operation for carrying out the recording processing or the reproduction processing in the information recording/reproducing apparatus S is carried out by the user.

In addition to this, the operating unit 133 generates an operational signal Sin indicating the content of the editing and outputs it to a system controller 125 when the editorial processing for editing (more specifically, deleting) the content which has been already recorded in the DVD-R 1R is carried out in the recording processing to be described later.

Further, the navigation information generator 126 generates the above navigation information signal Snd including the above respective navigation information to be recorded in the DVD-R 1R upon the recording processing or the editorial processing to be described later on the basis of the control of the system controller 125 based on an operational signal Sin and the recording information signal Sfm and outputs the generated navigation information signal Snd to one of inputting terminals of the formatter 122.

Therefore, the above formatter 122 superposes the recording information in the superpose signal Smx and the navigation information in the navigation information signal Snd, so that the above format signal Smt including the recording information having the physical format shown in FIG. 1 and FIG. 3 is generated.

In parallel with these operations, the system controller 125 generates respective control signals Scv, Sca, Scf, Ssc, Scdv and Scda for controlling the respective operations to output them to the corresponding composing members, respectively, while giving and receiving necessary information to and from the memory 127 as a memory signal Sm.

The information recording processing according to the present embodiment to be carried Out mainly by the system controller 125 in the information recording/reproducing apparatus S will be explained with reference to FIGS. 6 to 11.

In the following explanation, a case of recording the recording information in the DVD-R 1R along with a real time so that the recording format is the same as that of the DVD 1 for reproduction only, in which two VTSs 3 are recorded as shown in FIG. 8 will be explained.

According to the information recording processing of the present embodiment, as shown in FIG. 7, at first, the classes of the optical disc loaded in the information recording/reproducing apparatus S are determined by a publicly known method (step S1).

Then, if the determined kind of the optical disc is a DVD-RW capable of being written in plural times (step Si; RW), the recording processing is carried out with respect to the DVD-RW on the basis of a video recording standard (a standard which is plotted out to be complied with upon recording the information in the DVD-RW) (step S21) to terminate the processing.

On one hand, in the determination of the step S1, when the loaded optical disc is the DVD-R 1R (step S1; R), then, as shown in a first diagram from the left in FIG. 9, a reservation of a first recording zone 98 as an area corresponding to the DVD video standard on the DVD-R 1R is secured (step S2). The first recording zone 98 is an area for recording volume information 4 in the DVD video standard, file system information 5, the above VMG 12A composing the video manager 2, a VOBS 2B for a menu (a VOBS as a collection of the image information and the audio information to display a necessary menu) and the information corresponding to a backup VMGI 2C.

If the reservation securing of a first recording zone 98 is terminated, then, as shown in the first diagram from the left in FIG. 9, a reservation of the area for recording the information corresponding to a first VTSI 90A as the VTSI corresponding to a first VTS 3 in the DVD video standard added with the area for recording a tentative VMGI to be described later (a width of this area will be explained as 10 addresses below) is secured in an area corresponding to the DVD video standard on the DVD-R 1R as a second recording zone 99 (step S3).

As a result, the rest recordable area PA after the second recording zone 99 becomes undecided third recording zone 100.

When the reservation of the first recording zone 98 and the second recording zone 99 has been completely secured, then, a parameter for indicating a number of the VOB 10 to be recorded as the first VTS 3 is initialized on the system controller 125 (step S4). Further, navi pack relative position information to be included in the VOB 10 is also initialized on the system controller 125 (step S5).

When each initialization is terminated, then, first managing data Ml shown in FIG. 11 is recorded within a forth managing data small area MD4 in a first managing data area $116_{-1}$ in a managing data area 112. Therefore, it is recorded that the first recording zone 98 and the second recording zone 99 are reserved (step S6). In the first managing data M1, a head address of the first recording zone 98, i.e., "Oh (h represents hexadecimal and so forth")", a head address of the second recording zone 99, i.e., "600 h " and a head address of the undecided third recording zone 100, i.e., "640(=600+30+10) h" are recorded in the corresponding areas, respectively. Alternatively, at the present moment, the final recording positions of the first recording zone 98, the second recording zone 99 and the undecided third recording zone 100 are not decided, so that the all areas corresponding to the final recording positions thereof are assumed to be zero data.

When the recording of the first managing data M1 is completed, then, as the processing in the step S6, a first navi pack 41 as a first VTS 3 is further generated in the navigation information generator 126 to be recorded in the undecided third recording zone 100. In this case, since the encoding processing of the present invention is performed by the fixed encoding rate so that the reproduction time of one VOB unit 30 is always 0.5 second, as a result, the recording positions of respective VOB units 30 are also fixed. Therefore, it is possible to generate and record the navi pack 41 before the substantial portion of the recording information is recorded.

When the recording of the first navi pack 41 is terminated, then, the actual recording information is encoded by the above fixed encoding rate and the encoded information is recorded in the undecided third recording zone 100 followed by the first navi pack 41 (step S7).

Then, it is checked whether or not the encoding processing and the recording processing of the recording information corresponding to one VOB unit 30 are completed (step S8). When they are not completed (step S8; NO), the encoding processing and the recording processing are continuously performed. On the other hand, when the encoding processing and the recording processing of the recording information corresponding to one VOB unit 30 are completed (step S8; YES), a value corresponding to the data amount of one VOB unit 30 is added to a value of the navi pack relative position information till then, the value of the navi pack relative position information is changed to a value of the navi pack relative position information just after it on the system controller 125 (step S9) and further, it is checked whether or not sixty pieces of VOB units 30 are completely recorded (step S10).

Then, when the sixty pieces of VOB units 30 are not completely recorded (step S10; NO), in order to record the next VOB unit 30, the processing is returned to the step S6. On the other hand, when the recording is completed (step S10; YES), the identification number of the VOB 10 will be updated (step S11).

When the above processings are terminated, the VOB 10 including sixty pieces of the VOB units 30, of which reproduction times are all 0.5 second, namely, the reproduction thereof is 30 seconds, is formed in the undecided third recording zone 100.

After the step S11 is terminated, it is checked whether or not the operation for indicating that the recording processing for the DVD-R 1R should be stopped during the above described recording processing (step S12). Then, when the operation is not carried out (step S12; NO), the processing is returned to the above described step S5 to carry out the processing in the above described step S5 to step S11.

On the other hand, when the operation for indicating that the recording processing for the DVD-R 1R should be stopped is carried out (step S12; YES), then, the operation for securing the undecided third recording zone 100 and the second recording zone 99 is carried out (steps S13 and S14).

In this step S13, following the step S11, backup first VTSI 90C, i.e., a second one from the left in FIG. 9 is recorded. After that, second managing data M2 shown in FIG. 11 is recorded within a forth managing data small area MD4 in a second managing data area $116_{-2}$ in the managing data area 112. Further, the above described first managing data M1 is invalidated. Therefore, it is recorded that a first recording processing for the undecided third recording zone 100 (a first recording processing of the VTS 3) is completed. More specifically, in the second managing data M2, a head address of the first recording zone 98, i.e., "0h", a head address of the second recording zone 99,.i.e., "600h" and a head address of the undecided third recording zone 100, i.e., "640h" are recorded in the corresponding areas, respectively. At the same time, a final address of the backup first VTSI 90C, i.e., "669+ s1h ("s1" is a volume of the address area occupied by the first VOBS 90B) and a head address of an undecided forth recording zone 100A, i.e., "670+s1h" are recorded in the corresponding areas, respectively. Alternatively, at the time when the step S13 is terminated, the final recording positions of the first recording zone 98, the second recording zone 99 and the new undecided forth recording zone 100A are not decided, so that the all areas corresponding to the final recording positions thereof are assumed to be zero data.

Then, at the step S14, the processing is returned to the second recording zone 99 to record the original first VTSI 90A (having the same content as that of the foregoing backup first VTSI 90C). Further, the tentative VMGITV 1 as the tentative VMGI (namely, it is tentatively recorded at the point that recording of all recording information is not terminated in the DVD-R1R) corresponding to the recorded first VTS 3 is recorded.

At the step S14, the information to be recorded as the foregoing tentative VMGITV will be specifically explained with reference to FIG. 10. Following a managing table MT for managing the entirety of the tentative VMGITV, the information with respect to the VTS 3 corresponding to the tentative VMGI (in the case of the tentative VMGITV 1, a first VTS 3) are included in the tentative VMGITV. The number of the included information is the same as that of the VTS 3.

After that, third managing data M3 shown in FIG. 11 is recorded in a fourth managing data small area MD 4 in a third managing data area $116_{-3}$ in a managing data area 112 so as to invalidate the above second managing data M2. Hereby, it is recorded that the recording processing (the recording processing of the first VTSI 90A and the tentative VMGITV 1) to the second recording zone 99 has been completed. More specifically, in the third managing data M3, "0h" as a head address of the first recording zone 98, "600h" as ahead address of the second recording zone 99 and "640h" as a head address of the third recording zone 100 are recorded in the corresponding areas, respectively. At the same time, "669+ s1h" as a final address of the backup first VTSI 90C, "670+ s1h" as a head address of the fourth recording zone 100A and "639h" as a final address of the second zone 99 (in which the first VTSI 90A and the tentative VMGIVT 1 have been completely recorded) are recorded in the corresponding areas, respectively. Alternatively, at the point that the step S14 is terminated, final recording position of the first recording zone 98 and the fourth recording zone 100A are not decided, respectively, so that areas corresponding to them are assumed to be zero data.

If the processing of the step S14 is terminated, then, it is checked whether or not a new recording processing to the DVD-R 1R should be started (step S15) and further, the second VTS 3 is recorded in the embodiment (step S15; YES). Then, the number of the VTS is updated to "2" (step S22) and the processing is returned to the foregoing step S3, so that the processing in the above described step S3 to step S14 is carried out with respect to the second VTS 3.

In the step S15, in the case that stopping of recording is selected so as to carry out the editorial processing for deleting a portion of the first VTS 3, which has been recorded (step S15; NO), it is determined whether or not the editorial processing should be performed in practice in the next place (step S16). Since the deletion processing is not capable of being carried out in the DVD-R 1R, in order to substantially delete a portion of the first VTS 3, VMGI to be described later is described so that it is not reproduced upon reproduction. Then, when the editorial processing should be performed (step S16; YES), then, the editorial processing is performed in practice and a tentative VMGITV 2 for indicating the content of the VMGI corresponding to the information after the editorial processing is newly generated to be record in the vacant area of the DVD-R 1R (step S20) and the processing is returned to the step S15 again.

The present editorial processing will be specifically explained below. As shown in a fourth diagram from the left in FIG. 9, connecting to the backup first VTSI 90C, which has been recorded by the previous processing, the tentative VMGITV 2 for indicating the reproduction content of the first VTS 3 after the edition is recorded. Specifically, according to the recording processing of the tentative VMGITV 2 in the step S20, fourth managing data M4 shown in FIG. 11 is recorded in a fourth managing data small area MD 4 of a fourth managing data area $116_{-4}$ of a managing data area 112 to invalidate the above third managing data M3, so that it is recorded that the tentative VMGITV 2 has been additionally recorded.

In the fourth managing data small area MD 4, "0h" as a head address of the first recording zone 98, "600h" as a head address of the original second recording zone 99 (the first VTSI 90A), "640h" as a head address of the original third recording zone 100 (the first VOBS 90B and the backup first VTSI 90C), "669+s1h" as a final address of the backup first VTSI 90C, "670+s1h" as a head address of a new tentative VMGITV 2 and "679+s1h" as a final address of the tentative VMGITV 2 and "680+s1h" as a head address of a new undecided fifth recording zone 100B are recorded in the corresponding areas, respectively. Alternatively, at the point that the step S20 is terminated, final recording positions of the first recording zone 98 and the new undecided fifth recording zone 100B are not decided, respectively, so that areas corresponding to them are assumed to be zero data.

On one hand, when the foregoing editorial processing is not carried out, the processing is shifted to the recording processing of the second VTS 3 as it is. However, according to a series of the processing to the second VTS 3, as shown in a third diagram from the left in FIG. 9, reservation of an area (a recording zone) for recording the information corresponding to a second VTSI 91A, which is the VTSI corresponding to the second VTS 3 in the DVD video standard, is secured in the area corresponding to the DVD video standard on the undecided fourth recording zone 100A, so that the area, of which reservation is secured, is defined as a new fourth recording zone 101 (step S3; in order to simplify the explanation, in FIG. 7, the reservation securing processing of the fourth recording zone 101 is represented by "a second recording zone reservation").

As a result, a remaining recordable area PA after the new fourth recording zone 101 becomes an undecided fifth recording zone 100C.

When the reservation of the fourth recording zone 101 is completed, then, the foregoing steps S4 to S14 are carried out, so that the second VOBS 91B, the backup second VTSI 91C, the second VTSI 91A and the corresponding tentative VMGI are recorded in the undecided fifth recording zone 100C and the fourth recording zone 101 in this order.

On the other hand, in the case that the processing is shifter to the recording processing of the second VTS 3 after the foregoing editorial processing is carried out, according to the processing to this second VTS 3, at first, as shown in the fifth diagram from the left in FIG. 9, a reservation of the area for recording the information corresponding to a second VTSI 91A as the VTSI corresponding to a second VTS 3 in the DVD video standard added with the area for recording a tentative VMGI to be described later (a width of this area will be explained as 10 addresses below) is secured in an area corresponding to the DVD video standard on the DVD-R 1R as a fifth recording zone 102 (step S3).

Then, a reservation of a remaining recordable area PA except for the foregoing fifth recording zone 102 is secured as an undecided sixth recording zone 100D.

If the reservation of the fifth recording zone 102 is completed, then, the foregoing steps S4 to S14 are carried out, so that the second VOBS 91B, the backup second VTSI 91C, the second VTSI 91A and the tentative VMGI (i.e., a tentative VMGI corresponding to the contents of the edited first VTS 3 and the edited second VTS 3) VT 3 are recorded in the undecided sixth recording zone 100D and the fifth recording zone 101 in this order.

Alternatively, after the recording to the second VTSI 91A is terminated, the fifth managing data (not illustrated) for indicating the recording position of respective recording areas is recorded in the fourth managing data small area MD 4 in the fifth managing data area $116_{-5}$ in the managing data area 112.

As shown in the second diagram from the left in FIG. 9, the foregoing second VOBS 91B, the backup second VTSI 91C, the second VTSI 91A and the tentative VMGITV 3 are recorded in the corresponding areas, respectively (a reference numeral "s2" in the second diagram from the right in FIG. 9 represents a size of the address area occupied by the second VOBS 91B).

Further, in the case that the foregoing step S15 and the step S16 are determined again and the new recording processing is not started (step S16; NO), then, it is checked whether the termination processing (so-called finalizing processing) should be carried out or not (step S17). If it should not be carried out (step S17; NO), the processing is returned to the step S15. On the other hand, if it should be carried out (step S17; YES), then, the volume information 4 in the DVD 1 (i.e., the DVD video standard), the file system information 5 and the foregoing VMGI 2A comprising the video manager 2 and the information corresponding to the VOBS 2B for a menu and the backup VMGI 2C are recorded in the foregoing first recording zone 98, of which reservation is secured in the step S2. After that the sixth managing data (not illustrated) for indicating the recording position of respective recording areas is recorded in the fourth managing data small area MD 4 in the sixth managing data area $116_{-6}$ in the managing data area 112 to close the first recording zone 98 (step S18). Then, recording the foregoing start information to be recorded in the lead-in area LIA and the foregoing termination information to be recorded in the lead-out area LOA (step S19), all recording processing are completed.

Only if the processing till this step S19 are completed, as shown in the first diagram from the right in FIG. 9, the recording processing of the recording information including respective tentative VMGI along with a real time to the DVD-R 1R in the recording format based on the DVD video standard is completed. Therefore, it is possible to reproduce the recording information recorded on the DVD-R 1R by using the information reproduction apparatus for reproducing the recording information on the DVD for reproduction only based on the DVD video standard. Alternatively, unless the recording of the volume information 4, the file system information 5 and the like in the original first recording zone 98 is completed, the reproduction by the foregoing information reproduction apparatus is not capable of being performed.

Alternatively, upon recording the VMGI 2A in the foregoing step S18, with reference to the content of the newest tentative VMGI (a tentative VMGITV 3 in the case of FIG. 9), the VMGI 2A is recorded.

As described above, according to the information recording processing in the information recording reproduction apparatus of the embodiment, when the VTS 3 is recorded, the tentative VMGI is generated to be tentatively recorded in the DVD-R 1R. Therefore, even in the case that a plurality of VTSs 3 are recorded in the DVD-R 1R, the original VMGI is accurately recorded later on by using the tentative VMGI having the newest content, so that it is possible to carry out the information recording along with a real time in the DVD-R 1R as complying with the DVD video standard for the DVD 1 which does not presuppose the information recording along with a real time.

Alternatively, since the tentative VMGI is recorded in the area between the VOBS which has been completely recorded (for example, the first VOBS 90B) and the corresponding VTSI (for example, the first VTSI 90A), even when an error occurs during recording the VOBS, the tentative VMGI is recorded in front of an area on the DVD-R 1R in which this error occurs, so that it is possible to record the VMGI as preventing the tentative VMGI from being destroyed.

Further, when the editorial processing is performed with respect to the VTS 3 which has been already recorded, a new tentative VMGI is generated to be recorded in a vacant area, so that it is possible to record the newest tentative VMGI and protect it even if the editorial processing is performed during recording the VTS 3.

Alternatively, when recording of the VTS 3 in the DVD-R 1R is terminated, the VMGI 2A is generated by using the newest tentative VMGI which has been recorded at that time, so that it is possible to accurately record the VMGI 2A by using the newest tentative VMGI.

Further, since the VMGI 2A is recorded in the area on the DVD-R 1R to be detected ahead of the VTS 3, it is possible to control the reproduction of the VTS 3 by certainly obtaining the VMGI 2A ahead of the reproduction of the VTS 3.

Alternatively, when the program corresponding to a flow chart shown in FIG. 7 is recorded in a flexible disc or a hard disc or the like as the information recording medium to be read out by using a personal computer or the like, it is also possible to operate the personal computer or the like as the foregoing system controller 125.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-247033 filed on Aug. 16, 2000 including the specification, claims, drawings and summary is incorporated herein by reference in its entirety.

What is claimed is:

1. An information recording apparatus for recording: information onto a write-once recording medium in conformity with a recording format for a reproduction only recording medium, said recording format being constituted to include at least: unit record information including record information to be reproduced by an information reproducing apparatus and reproduction control information for controlling a reproducing mode in reproduction of said record information in said information reproducing apparatus; and managing control information for respectively controlling reproduction mode of one or a plurality of pieces of said unit record information, the apparatus comprising:
a first recording device for recording said unit record information onto said write-once recording medium
a generating device for generating, each time recording of one piece of said unit record information is completed, tentative managing information that is control information corresponding to the recorded unit record information and for subsequently forming and recording onto said write-once recording medium said managing control information;
a second recording device for recording the generated tentative managing information onto said write-once recording medium each time said unit record information is recorded onto said write-once recording medium
wherein said tentative managing information is tentative managing information for the whole of pieces of the unit record information already recorded, for subsequently generating and recording onto said write-once recording medium said managing control information for controlling reproduction of all of pieces of unit record information recorded onto said write-once recording medium,
wherein said first recording device records, after recording said record information included in said unit record information to be recorded by said first recording device, said reproduction control information included in said unit record information together with said record information in an area on said write-once recording medium that is to be detected before said record information, and
wherein said second recording device records said tentative managing information in an area on said write-once recording medium positioned between an area in which said record information is recorded by said first recording device and an area in which said reproduction control information is recorded by said first recording device.

2. The information recording apparatus according to claim 1, further comprising an editing device for executing an editing for changing reproduction contents of said record information already recorded in said write-once record information,
wherein, when said editing is performed, said generating device newly generates tentative managing information corresponding to said record information after the editing, and
wherein said second recording device records the newly generated tentative managing information in a vacant area on said write-once recording medium.

3. The information recording apparatus according to claim 1, further comprising a third recording device for generating, when completing the recording of said record information onto said write-once recording medium, said managing control information using said tentative managing information already recorded, and for recording said managing control information onto said write-once recording medium.

4. The information recording apparatus according to claim 3, wherein said third recording device records said managing control information in an area on said write-once recording medium that is to be detected before said unit record information.

5. The information recording apparatus according to claim 1, wherein said write-once recording medium is a DVD-R (DVD-Recordable), and said unit record information is a VTS (Video Title Set) in said recording format, and said managing control information is a VMGI (Video Manager Information) in said recording format.

6. An information recording method for recording information onto a write-once recording medium in conformity with a recording format for a reproduction only recording medium, said recording format being constituted to include at least: unit record information including record information to be reproduced by an information reproducing apparatus and reproduction control information for controlling a reproducing mode in reproduction of said record information in said information reproducing apparatus; and managing control information for respectively controlling reproduction mode of one or a plurality of pieces of said unit record information, the method comprising:

a first recording process for recording said unit record information onto said write-once recording medium;

a generating process for generating, each time recording of one piece of said unit record information is completed, tentative managing information that is control information corresponding to the recorded unit record information and for subsequently forming and recording onto said write-once recording medium said managing control information;

a second recording process for recording the generated tentative managing information onto said write-once recording medium each time said unit record information is recorded onto said write-once recording medium wherein said tentative managing information is tentative managing information for the whole of pieces of the unit record information already recorded, for subsequently generating and recording onto said write-once recording medium said managing control information for controlling reproduction of all of pieces of unit record information recorded onto said write-once recording medium, wherein in said first recording process, after recording said record information included in said unit record information to be recorded by said first recording device, said reproduction control information included in said unit record information together with said record information is recorded in an area on said write-once recording medium that is to be detected before said record information, and wherein in said second recording process said tentative managing information is recorded in an area on said write-once recording medium positioned between an area in which said record information is recorded by said first recording process and an area in which said reproduction control information is recorded by said first recording process.

7. The information recording method according to claim 6, further comprising an editing process for executing an editing for changing reproduction contents of said record information already recorded in said write-once record information, wherein, when said editing is performed, in said generating process tentative managing information corresponding to said record information after the editing is newly generated, and wherein in said second recording process the newly generated tentative managing information is recorded in a vacant area on said write-once recording medium.

8. The information recording apparatus according to claim 6, further comprising a third recording process for generating, when completing the recording of said record information onto said write-once recording medium, said managing control information using said tentative managing information already recorded, and for recording said managing control information onto said write-once recording medium.

9. The information recording apparatus according to claim 8, wherein in said third recording process said managing control information is recorded in an area on said write-once recording medium that is to be detected before said unit record information.

\* \* \* \* \*